(12) United States Patent
Martz

(10) Patent No.: US 9,903,530 B1
(45) Date of Patent: Feb. 27, 2018

(54) TEMPORARY AWNING FOR J-CHANNEL APPLICATION

(71) Applicant: Bruce Delmar Martz, Chesapeake, VA (US)

(72) Inventor: Bruce Delmar Martz, Chesapeake, VA (US)

( * ) Notice: Subject to any disclaimer, the term of this patent is extended or adjusted under 35 U.S.C. 154(b) by 0 days.

(21) Appl. No.: 14/998,596

(22) Filed: Jan. 22, 2016

(51) Int. Cl.
| | |
|---|---|
| F16M 11/00 | (2006.01) |
| F16M 13/02 | (2006.01) |
| E04F 10/00 | (2006.01) |
| F16M 13/00 | (2006.01) |
| F16B 45/00 | (2006.01) |

(52) U.S. Cl.
CPC ............ F16M 13/02 (2013.01); E04F 10/00 (2013.01); F16B 45/00 (2013.01); F16M 13/005 (2013.01)

(58) Field of Classification Search
CPC ........ B60P 3/343; F16M 13/005; F16M 13/02
USPC ..... 160/67; 135/88.12; 248/311.3, 682, 686, 248/220.21, 304, 309.1
See application file for complete search history.

(56) References Cited

U.S. PATENT DOCUMENTS

| | | | |
|---|---|---|---|
| 2,050,159 A | 8/1936 | Col. | |
| 2,075,153 A | 3/1937 | Wilmanns | |
| 5,148,848 A * | 9/1992 | Murray | B60P 3/343 160/66 |
| 5,437,322 A * | 8/1995 | Murray | B60P 3/343 160/45 |
| 5,560,412 A * | 10/1996 | Murray | B60P 3/343 160/67 |
| 5,860,440 A * | 1/1999 | Murray | B60P 3/343 135/88.12 |
| 6,412,536 B1 | 7/2002 | Vannetta | |
| 8,438,802 B1 | 5/2013 | Hay | |
| 8,863,452 B1 | 10/2014 | Hay | |

OTHER PUBLICATIONS

U.S. Appl. No. 61/217,635, filed Dec. 9, 2010, Naylor.

* cited by examiner

Primary Examiner — Todd M Epps
(74) Attorney, Agent, or Firm — Bruce D. Martz

(57) ABSTRACT

One embodiment of a linear U-shape that can be molded into or attached to an awning or other feasible accessory allowing them to be mounted to a J-channel.

5 Claims, 4 Drawing Sheets

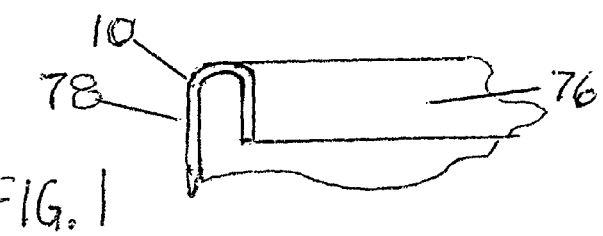
FIG. 1
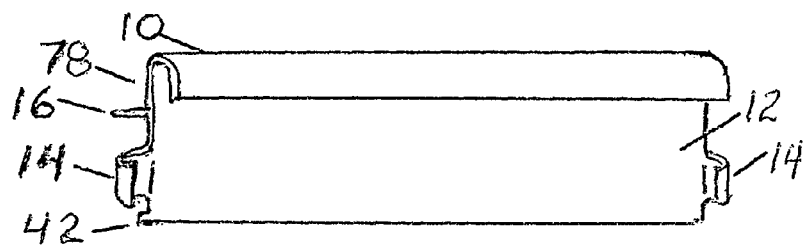
FIG. 2
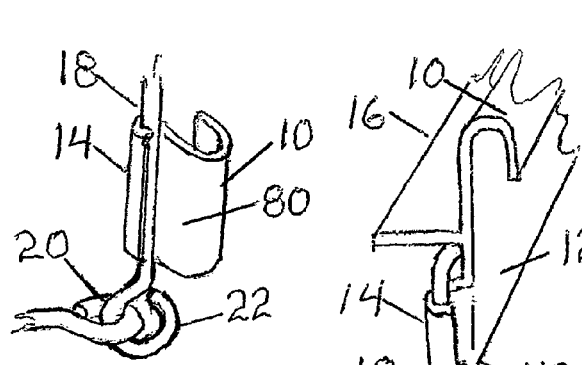
FIG. 3
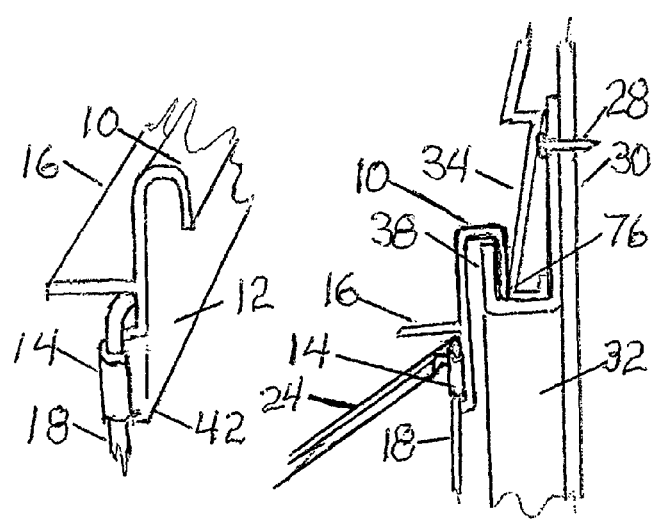
FIG. 4
FIG. 5

TEMPORARY AWNING FOR J-CHANNEL APPLICATION

CROSS-REFERENCE TO RELATED APPLICATIONS

This application claims the benefit of provisional patent application Ser. No. 62/107,297 filed 2015 Jan. 23 and Ser. No. 62/107,215 filed 2015 Jan. 23, both filed by the present inventor.

FEDERALLY SPONSORED RESEARCH

Not Applicable

SEQUENCE LISTING OR PROGRAM

Not Applicable

BACKGROUND

Field

This application relates to temporary awning mounting devises; specifically mounting devices designed for J-channel application.

Prior Art

Awnings are widely available in numerous designs by many manufacturers and are generally installed on a permanent basis. Although there are some that are not permanent, most still require installing hardware during mounting. Others include bulky and heavy parts not ideally suited for mounting onto J-channel.

One example, U.S. Pat. No. 2,050,159 to Col (1935) requires that the upper most section of the fabric portion (FIG. 2) of an awning to pass between the upper rail of the upper sash and the top portion of the window frame ending with a pull down shade fixed to the end of said fabric acting as a stop inside the dwelling. This design does not allow the top sash to be open while the awning is in use.

Being that the fabric of the awning can be no wider than the upper sash window opening will allow, it will offer limited protection from the weather and sun at each side than if it were widened to extend beyond the opening. Furthermore, this awning requires a pair of arms (FIG. 4) to be adjusted and secured with a clamping jaw to the lower rail of the upper sash.

A second example employing an alternate method of installation is Pub. No.: US 2010/0307695 A1 Pub. Date Dec. 9, 2010 by Naylor. This awning is fixed with an adhesive strip as described by the inventor, as similar to that used in 3M Corps.-Post Its-™. Also described was a method using hook and loop material instead of said adhesive strip. Although these methods allow easy removal, they will not offer adequate weather proofing where a mounting device designed to hook over the top J-channel surrounding the window would deflect the rain, shielding the top area of the installation.

A third example U.S. Pat. No. 6,412,536 B1 to Vannetta (Jul. 2, 2002), utilizes a channel anchor assembly (FIG. 3) (32) to mount the awning to the structure. Although this method allows an awning to be mounted on a temporary basis, it would require that the channel be installed using fasteners for anchoring said channel to the structure. An awning mounted to J-channel utilizes an existing part of an installed window and requires no hardware.

A fourth example, —Accessory Mounting Devices for Window Systems—, U.S. Pat. No. 8,438,802 B1 to Hay et. al. (May 14, 2013) generally employs the use of a Mounting Base (500) (FIG. 5 through FIG. 20) a Female body (502) and a Male body (504) that engages said Female body. Said Female body engages a flat plane (506) of a window frame (510) with a fastener passing through the accessory while engaging said Male body.

This method of installation, although versatile, incorporate many parts and does not offer an adequate solution to shielding the rain from the window as said mounting bases (500) are situated on the outer, front face of the window frame. An awning using the embodiment claimed, would mount over the J-channel causing rain to either pass over the face of said embodiment running down the face of said awning and away from the window, or be channeled away via the J-channel surrounding said window thus needing no fasteners to install.

A fifth example being—Trim for Mounting Exterior Coverings for Windows—U.S. Pat. No. 8,863,452 B1 (Mar. 14, 2013) incorporates the use of a storm trim comprising of a lineal base having a stacked screw boss running perpendicular to the length of said base for receiving anchoring screws thus allowing the installation of exterior coverings.

This method would require the permanent installation of said storm trim where as an awning installed using the mounting device claimed by the inventor, leaves no visible signs of being mounted to the window when removed.

A sixth example being—Awning Construction—U.S. Pat. No. 2,075,153 to Reynolds and Kucera (Mar. 30, 1937) wherein the inventors have designed a portable and quickly demountable awning of inexpensive construction. Although this awning is not permanent, it requires the permanent installation of a pair of suitable eyelets (FIG. 3) (26) secured to the window frame to engage with a pair of hooks (FIGS. 1-3-7-9) (24) fixed to the top portion of said awning allowing a method for mounting.

This design leaves an opening between the window and the awning at the top section of the awning and the face of the frame at the top section of the window after installation. Furthermore, the awning may prove difficult to align said hooks (FIG. 1-3-7-9) (24) to said eyelets (FIG. 3) (26) for coupling when mounting as they are located at the top of said awning making the coupling process difficult to see.

The simplicity of a mounting device utilizing the claimed embodiment allows easy installation as said mounting device will seat itself using gravity to maintain its position when aligned and hooked over the top J-channel when installed needing no hardware or tools to install and leaving no damage to the window when removed.

SUMMARY

In accordance with one embodiment, a linear mounting device, generally having a U shape, comprised of light weight but adequate material and having dimensions compatible for mounting to J-channel when fixed to an awning or other accessory.

DRAWINGS—Figures

FIG. 1—shows a partial right end view of the form creating the source of function as applied in accordance with one embodiment FIG. 2—shows the back view of the invention as applied to an awning truss in accordance with another embodiment FIG. 3—shows an example of the invention as applied to an awning stabilizer in accordance with another embodiment FIG. 4—shows an end view of FIG. 2 in accordance with said embodiment FIG. 5—shows a top right side view of an awning fastened to the truss in FIG. 2 and mounted to the J-channel being fastened to a structure as shown in the cross sectional view of the right side section of the drawing FIG. 6—shows a view of an awning mounted to J-channel using the design mentioned in FIGS. 2, 3 and 4

FIG. 7—shows a right side rear view of the awning design shown in FIG. 6

FIG. 8—shows the top right side of an awning design constructed in accordance with one embodiment FIG. 9—shows a view of the bottom right front of the awning mentioned in FIG. 8

FIG. 10—shows the top and bottom frame connection and featuring a stabilizer in accordance with another embodiment FIG. 11—shows a cross sectional view of the frame connection mentioned in FIG. 10

FIG. 12—shows a right front perspective view of the awning mentioned in FIGS. 8, 9, 10 and 11

FIGS. 13, 14 and 15 shows various adaption for connection claimed mounting device in FIG. 10 accessories

| DRAWINGS - Reference Numerals | | | |
|---|---|---|---|
| 10 | Inverted Linear U shape mounting device | 12 | Top Truss |
| 14 | C-clasp | 16 | Rain Shield |
| 18 | Top Frame | 20 | Bottom Frame |
| 22 | Frame Coupling | 24 | Awning Fabric |
| 26 | Tension Brace | 28 | Fastener |
| 30 | Sheeting | 32 | Window Trim |
| 34 | Siding | 36 | Window |
| 38 | J-channel | 40 | Awning Fabric Sleeve |
| 42 | Fold | 44 | Bottom Section Tension Brace |
| 46 | Connecting Sleeve Tension Brace | 48 | Top Section Tension Brace |
| 50 | Top Frame Connecting Disc | 52 | Bottom Frame Connecting Disc |
| 54 | Screw Hole | 56 | Screw Top |
| 58 | Adjustment Teeth | 60 | Screw |
| 62 | Fabric End | 64 | C-Channel |
| 66 | Fastening Rod | 68 | Accessory Location |
| 70 | Nut | 72 | Bolt |
| 74 | Mounting Device to Accessory Connection | 76 | Linear Edge of open section (back) |
| 78 | Front Side Mounting Device | 80 | Stabilizers |

DETAILED DESCRIPTION

FIGS. 1 Through 5

One embodiment of an inverted linear U shape mounting device (10) is illustrated in FIG. 1 showing the right end back side (76) of an inverted linear U shape (10) of undetermined width and length as illustrated on the right side of the drawing with a wavy line. A truss (12) is formed after the length is determined with a C shape formed on each end in a vertical position with the open portion facing towards the back constructing a C-clasp (14) for gripping the upper section of the top frame (18) of the awning as seen in FIGS. 2 and 4. This design is duplicated on the other end in a manner to mirror the existing side creating a top truss (FIG. 2). Hence there is a right side top frame 18 and a left side top frame 18, best seen in FIG. 7, each extending vertically along the opening of the structure. At the bottom, a small fold (42) can be added to make the bottom more rigid.

FIGS. 2, 3, 4, 6 and 7

Illustrate an Awning featuring the embodiment and fitted with a top (18) and bottom (20) frame made of rods bent to positions to form a U shape having a 360 degree bend on the ends where the top (18) and the bottom (20) sections can be coupled (22). A fabric (24) with a sleeve (40) fixed to each end is attached to the frame by inserting each side of the said framework through the sleeves (40) in a manner to oppose each other. The top (18) and bottom (20) frames are then joined together by interlocking the ends of the rods to opposite positions and in a chainlike manner. Best seen in FIG. 7, right and left side bottom frames 20 each comprise a rod having a proximal end engaging the frame coupling 22 and a distal end inserted into the bottom sleeve 40 of the awning.

As seen in FIG. 7, one sleeve 40 extends horizontally along a top of the opening (or window 36), while another sleeve 40 extends horizontally. The awning fabric 24 spans the sleeves 40. The top truss 12 extends horizontally along the opening.

A tension brace consisting of a top (48) and bottom (44) rod with a 360 degree bend on one end of each and having a sleeve (46) to connect each side by sliding over the free end of said rods and is attached to the frame. This is achieved by calculating the amount needed with the awning illustrated in FIGS. 6 and 7 having two. They are situated on the back side of the fabric spaced apart and parallel at a desired position with said 360 degree bend wrapping around the rods making the top (48) and the bottom (20) frames. The top (48) and bottom tension brace (48) are connected by sliding a connecting sleeve (46) over the free ends of the top (48) and bottom (44) braces to rest in a position that each is midway inside the connecting sleeve (46) making the fabric (24) taut. Right and left side tension braces 26 each comprise a top section 48 extending from a right side of the top truss 12 toward a right side of the bottom sleeve 40 of the awning. Bottom section 44 of the tension braces 48 includes a proximal end inserted into the bottom sleeve 40 of the awning and a distal end proximate the top section 48 of the right and left side tension braces.

The top truss (12) is attached to the awning by aligning the center section of the frame (18) to the front of the top truss (12) running below and parallel with the rain shield (16) and fitted within the C-clasp (14) (e.g., right side and left side C-clasps 14). on each side then being snapped into place. In FIG. 3 on the bottom section of the top frame (18) a stabilizer (80) is attached to each side. This stabilizer (80) is constructed using the mounting device (10) being attached to a C-clasp (14) and mounted to the lower section of each side of the top frame (18). It is inserted into the open end of the C-clasp (14) in a position just above the coupling (22) of the top (18) and bottom frame (20).

Operation

FIGS. 2 Through 5

This mounting device (10) is designed to mount specifically to a J-channel (38) generally mounted to outside sheeting (30) on a structure using a fastener (28) while surrounding the outside edge of a window frame (32) or other framework located within an opening in siding (34) and providing a channel for deflecting water from the opening.

The mounting device (10) is attached to the J-channel (38) by aligning the mounting device (10) with the back edge (76) facing towards the J-channel (38) in a manner that allows the back edge (76) to hook over the top of the front edge of the J-channel (38) coming to rest inside.

During horizontal application, this design generally relies on gravity to maintain the installation with the back edge (76) of the mounting device (10) transferring the load to the J-channel. Fasten the mounting devices (10) vertically by attaching them to the bottom sections on opposing sides of the top frame (18) being aligned in a manner to hook around the J-channel (38) creating stabilizers (80).

Additional Embodiments

Another embodiment is evident in FIGS. 8, 10 and 12 showing partial and complete views of an awning employing the mounting device shown in FIG. 1, but using an alternate method for attaching said embodiment to an awning frame. In this example, the mounting device (10) is molded as part of the frame where as the awning previously discussed fixed the mounting device (10) to a component (12) (80) then attached the component (12) (80) to the awning frame (18) (20).

This awning design consists of a two piece frame being the top (18) and bottom (20) having the mounting device (10) molded into the frame of the awning shown in FIG. 12 in three locations. FIG. 8 shows a view of the top truss (12) constructed with the mounting device (10) running parallel and attached to a C-channel (64) designed to fasten the fabric (24) by wrapping it around a rod (66) then inserting the rod (66) into the C-channel (64) with very little of the fabric end (62) visible on the outside edge. A pair of arms are attached to each end and run parallel and with connecting discs (50) (52) on the ends. Located on both sides of the connecting discs (50) (52) the mounting device (10) has been molded into the arms in a parallel position with the inside edge (76) facing inward in a manner to hook around the J-channel (38) thus completing the top framework.

FIGS. 9 and 10 show bottom frame (20) consisting of a C-channel (64) with the same capabilities as previously stated having an arm attached on each end in a parallel fashion ending with connecting discs (50) (52) completing the bottom framework. These connecting discs (50) (52) are fastened to the frames (18) (20) in a position that when the top (18) and bottom frame (20) are aligned for connecting, the inside face of the opposing discs (50) (52) will mesh together. A screw (60) is then inserted through the outside center of the top connecting discs (50) into a stop (56) located in the center of the bottom frame connecting disc (52). The inside circumference of each disc contain a row of teeth (58) running parallel with the outer edge of the inside face in a manner to mesh with the opposing side. These teeth (58) offer resistance to facilitate the frame adjustment. This awning (FIG. 12) is mounted to the J-channel in a manner consistent with method previously stated in the text.

Other embodiments are illustrated in FIGS. 13, 14 and 15 showing other possibilities for attaching the mounting device (10) to an accessory compatible with J-channel application.

CONCLUSION

Figure 6:
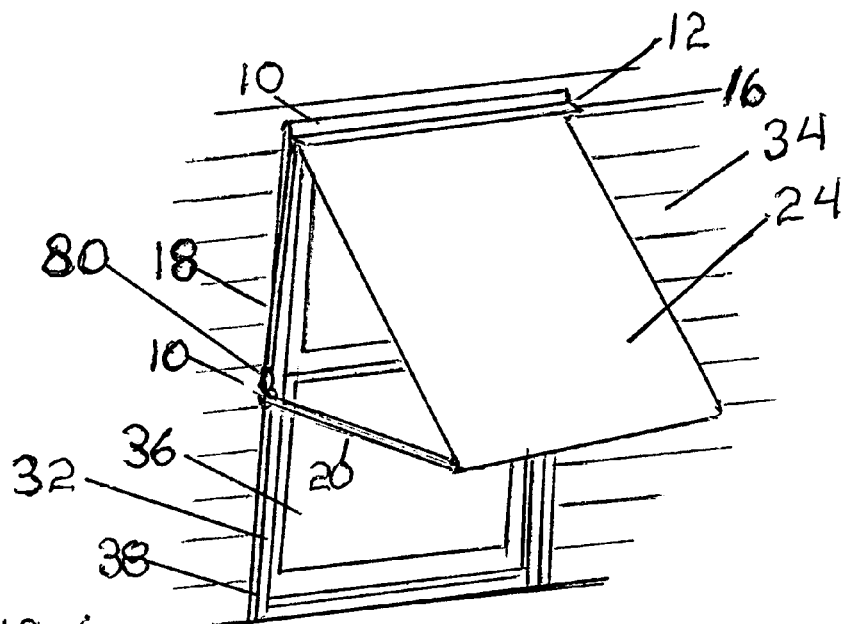
Figure 7:
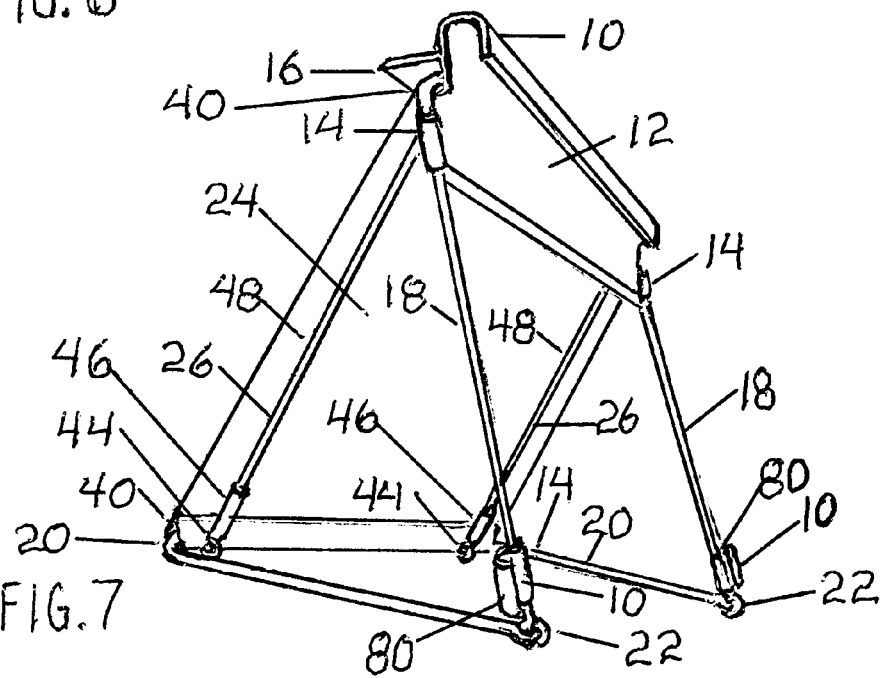
Figure 8:
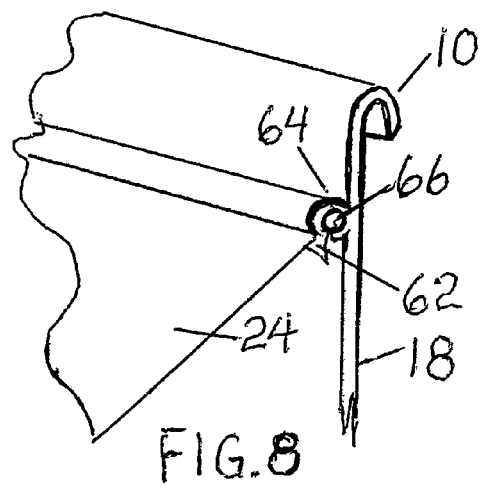
Figure 9:
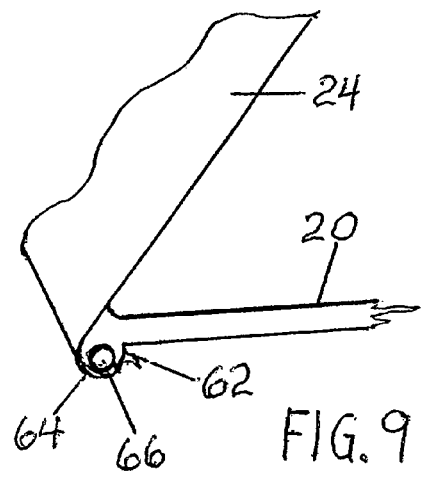
Figure 10:
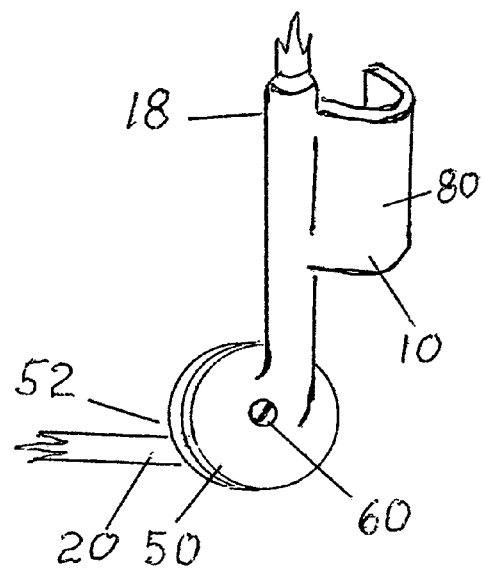
Figure 11:
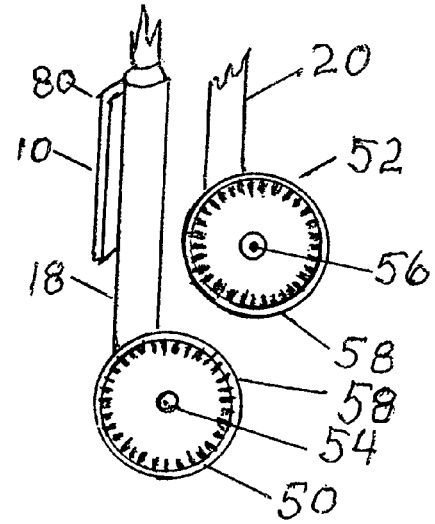
Figure 12:
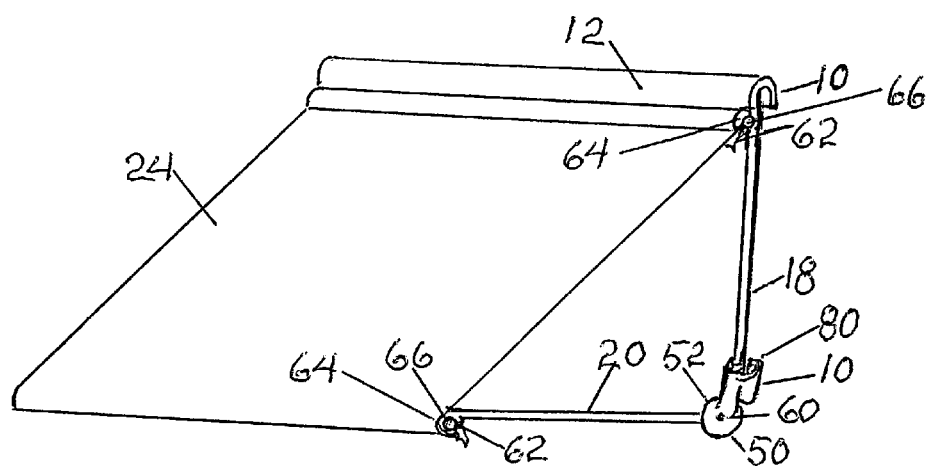
Figures 13, 14, 15:
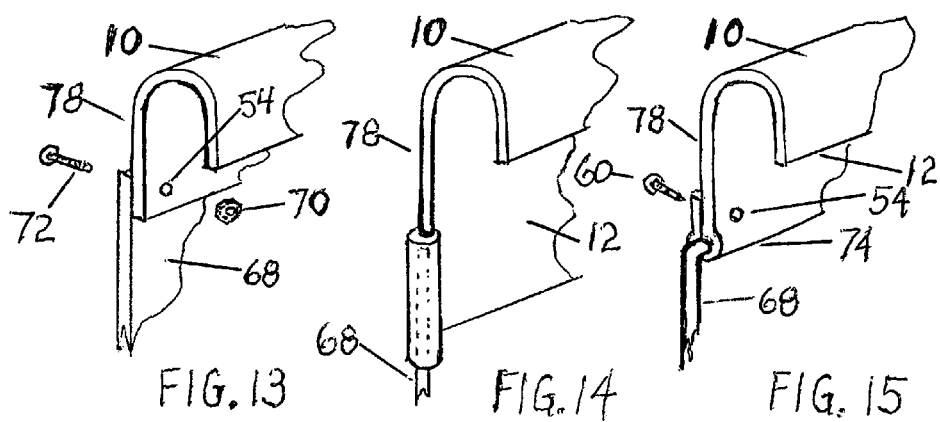
FIG. 13 shows a partial view of a mounting device to accessory connection (74) having both joined together in the accessory location (68) by aligning said item with the front side (78) of the mounting device (10) and fastening with a nut (70) and bolt (72).
FIG. 14 shows a partial view of a rod representing the accessory (68) inserted into a sleeve (74) running adjacent to the top truss (12).
FIG. 15 shows a partial view of a top truss (12) constructed by folding the edge of the mounting devices (10) front side (78) around a rod representing an accessory (68) and fastening with a screw (60).

These methods represent only a limited example of possible application as other configurations may be employed using alternate "accessory to mounting device" connecting methods, with all methods employing the mounting device (10) claimed by the inventor to facilitate the installation of an awning or other compatible accessory to J-channel.

The simplicity of the mounting procedure requiring no hardware or tools and leaving no alterations or damage when removed makes this awning truly accessible to anyone having J-channel covering their dwelling.

This awning can be used to exhibit many motifs making it appealing to a large cross-section of people. Below I have listed possibilities being:
  1. sports logos
  2. holiday motifs
  3. announcements (birth, marriage, greetings, personal messages, etc.)
  4. business signs
  5. artwork
  6. geometric patterns
  7. unlimited color combinations This awning would be inexpensive to construct and ship due to its light weight and would be available for use to consumers who rent their homes as it is temporary and will create no damaging effect on a dwelling due to the design of the mounting device.

The invention claimed is:

1. A temporary awning for an opening of a structure, the opening having a J-channel encompassing a perimeter of the opening, the temporary awning comprising:
    an awning comprising
        a first sleeve extending horizontally along a top of the opening,
        a second sleeve extending horizontally, and
        an awning fabric spanning the first sleeve and the second sleeve;
    a top truss extending horizontally along the opening, the top truss comprising
        an inverted linear U shape mounting device, for engaging the J-channel, and
        a right side C-clasp and a left side C-clasp;
    a right side top frame extending vertically along the opening and comprising a rod including
        an upper end gripped by the right side C-clasp of the top truss and engaging the awning,
        a lower end comprising a frame coupling, and
        a right side stabilizer attached to a bottom section of the right side top frame, the right side stabilizer hooked around the J-channel;
    a right side bottom frame comprising a rod having a proximal end engaging the frame coupling and a distal end inserted into the second sleeve of the awning;
    a right side tension brace, comprising
        a top section extending from a right side of the top truss toward a right side of the second sleeve of the awning,
        a bottom section including a proximal end inserted into the second sleeve of the awning and a distal end proximate the top section, and
    a left side top frame extending vertically along the opening and comprising a rod including an upper end gripped by the left side C-clasp of the top truss and inserted into the first sleeve of the awning,
a lower end comprising a frame coupling, and
a left side stabilizer attached to a bottom section of the left side top frame, the left side stabilizer hooked around the J-channel;

a left side bottom frame comprising a rod having a proximal end engaging the frame coupling and a distal end inserted into the second sleeve of the awning;

a left side tension brace, comprising
a top section extending from a left side of the top truss toward a left side of the second sleeve of the awning,
a bottom section including a proximal end inserted into the second sleeve of the awning and a distal end proximate the top section, and
a connecting sleeve slid over the top section and the bottom section.

2. The temporary awning of claim 1, wherein respective upper ends of the right side top frame and left side top frame engage the awning by insertion into the first sleeve of the awning.

3. The temporary awning of claim 1, wherein the awning is fastened to the top truss by being wrapped around a rod inserted into a C-channel.

4. The temporary awning of claim 1, wherein the awning is fastened to the bottom frame by being wrapped around a rod inserted into a C-channel.

5. The temporary awning of claim 1, wherein the frame coupling comprises a connecting disc fastened to each of the right and left top frames and a connecting disc fastened to each of the right and left bottom frames, wherein respective inside faces of connecting discs 50 and 52 will mesh together to offer resistance to facilitate frame adjustment.

\* \* \* \* \*